US006402236B1

(12) United States Patent
Yates

(10) Patent No.: US 6,402,236 B1
(45) Date of Patent: Jun. 11, 2002

(54) SPLIT RAIL BICYCLE SADDLE

(76) Inventor: Paul M. Yates, 5814 Briar Tree Dr., LaCanada, CA (US) 91011

( * ) Notice: Subject to any disclaimer, the term of this patent is extended or adjusted under 35 U.S.C. 154(b) by 0 days.

(21) Appl. No.: 09/546,302

(22) Filed: Apr. 10, 2000

(51) Int. Cl.$^7$ ................................................. B62J 1/00
(52) U.S. Cl. ..................................................... 297/201
(58) Field of Search ........................... 297/195.1, 201, 297/202

(56) References Cited

U.S. PATENT DOCUMENTS

| 570,497 A | * | 11/1896 | Pattisson | 297/202 |
| 593,331 A | * | 11/1897 | Noirit | 297/201 |
| 603,943 A | * | 5/1898 | Clifford | 297/201 |
| 633,487 A | * | 9/1899 | Radermacher | 297/201 |
| 656,854 A | * | 8/1900 | Nord | 297/201 |
| 4,089,559 A | | 5/1978 | Prange et al. | 297/201 |
| 4,387,925 A | | 6/1983 | Barker et al. | 297/201 |
| 4,512,608 A | | 4/1985 | Erani | 297/201 |
| 4,541,668 A | | 9/1985 | Rouw | 297/201 |
| 4,877,286 A | | 10/1989 | Hobson et al. | 297/195 |
| 5,123,698 A | | 6/1992 | Hodges | 297/201 |
| 5,709,430 A | | 1/1998 | Peters | 297/201 |
| 5,725,274 A | | 3/1998 | Bergmeister | 297/201 |
| 5,823,618 A | | 10/1998 | Fox et al. | 297/201 |
| 5,873,626 A | | 2/1999 | Katz | 297/202 |
| 5,911,474 A | | 6/1999 | Lee | 297/201 |

FOREIGN PATENT DOCUMENTS

| GB | 23654 | * | 7/1906 | 297/201 |

OTHER PUBLICATIONS

5918931 Jul. 6, 1999 Culbertson 297 202 Feb. 24, 1998.*
6039395 Mar. 21, 2000 Culbertson 297 202 Jul. 6, 1999.*

* cited by examiner

Primary Examiner—Peter R. Brown
(74) Attorney, Agent, or Firm—Walter A. Hackler

(57) ABSTRACT

A bicycle saddle includes a pair of elongate cushions, with each cushion having a horn and a seat area. A front frame is provided for holding the horn areas of each cushion in a spaced apart relationship with one another and a separate rear frame is provided for holding the seat areas of each cushion in a spaced apart relationship with one another. The front frame and the rear frame are spaced apart with one another and rails interconnecting the front and rear frame are provided for enabling attachment of the saddle to a bicycle post. Adjustable fasteners disposed in the rear frame are provided for enabling adjustment of the spaced apart relationship between the cushion rear areas and screws disposed in the rear frame are provided for adjusting the tension in the cushions between the front and rear frames which enables the adjustment of the resiliency of the saddle.

13 Claims, 5 Drawing Sheets

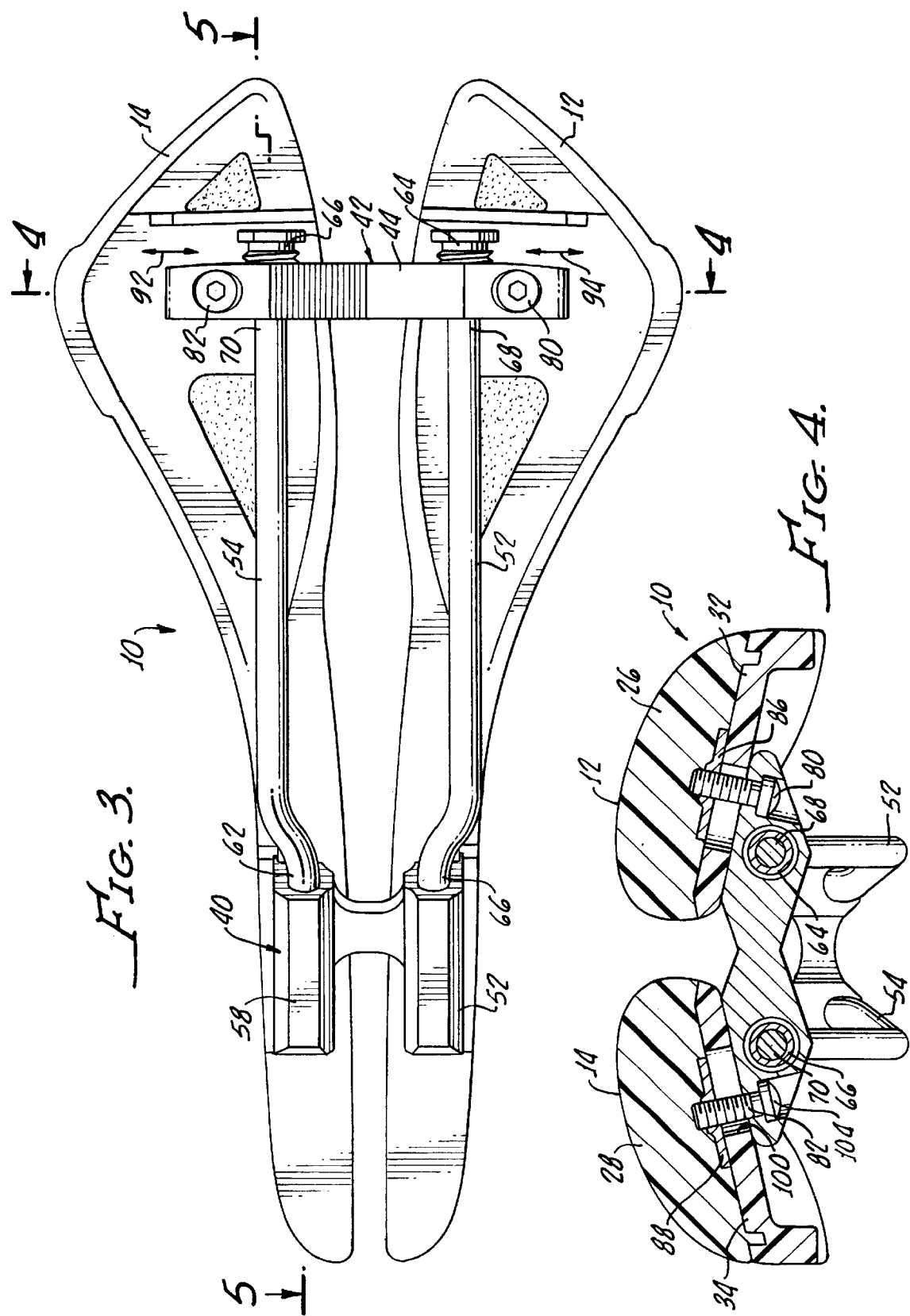

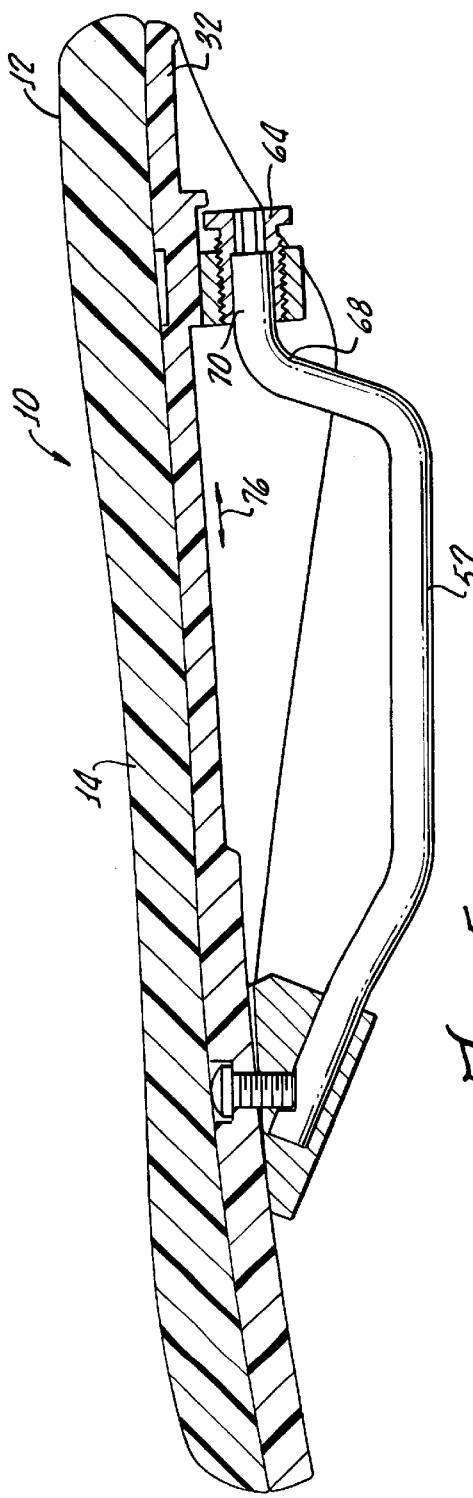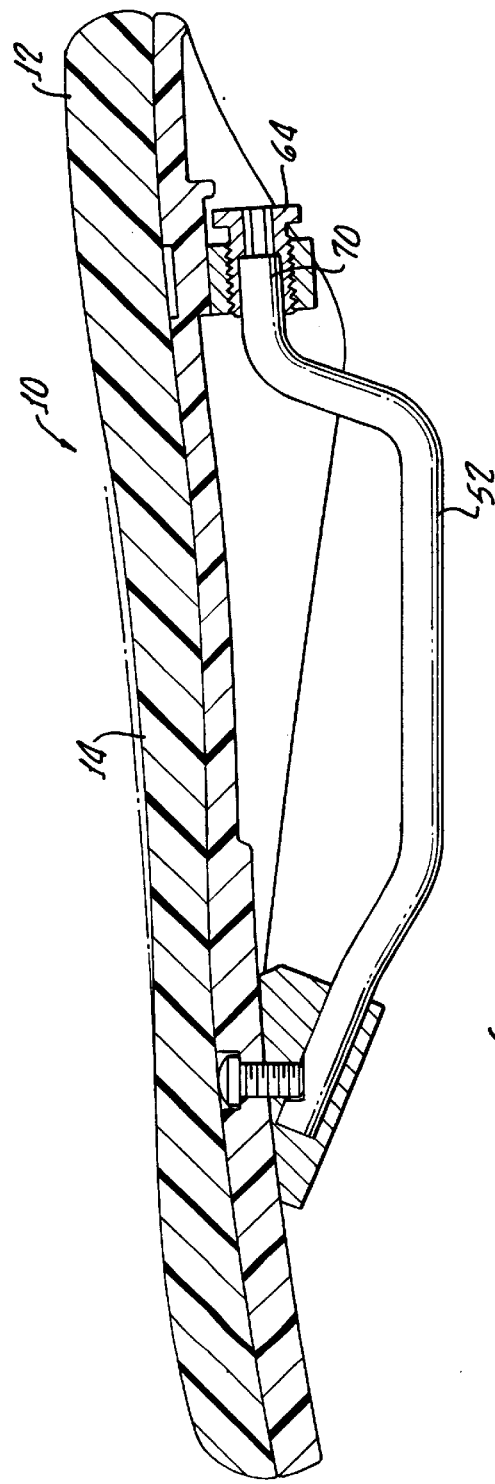

SPLIT RAIL BICYCLE SADDLE

The present invention generally relates to saddles or seats used for supporting a bicycle rider and is more particularly directed to bicycle seats which support the rider with separate support surfaces.

Cycling provides recreation, exercise and a sport for many individuals.

Conventional bicycle seats or saddles are typically of a one-piece design, and include a wider seat portion and a narrower "horn" portion. The horn, sometimes referred to as a pommel, is disposed toward a front of the saddle. Most conventional saddles to not provide adequate comfort for the rider. This is in part due to the cushioning provided in the saddle, the suspension utilized between the saddle and a bicycle mounting post, and, further, the dimensions of the bicycle saddle do not appropriately match that required by the rider. This is particularly important with regard to the width of the bicycle saddle. This limitation of conventional bicycle saddles results in a failure to uniformly support a rider's buttock.

Due to the fact that bicycle saddles only provide a small contact area for supporting the entire weight of the rider, the contact areas are subject to intense pressure.

An imbalance between the supported and unsupported parts of the rider's buttock generally results in physical discomfort for the rider. In response, the rider must engage in constant shifting and repositioning on the bicycle saddle in order to relieve the anatomical pressure points. Naturally, such movement interferes with the rider's rhythm and control which is particularly important in the sport of bicycle racing.

For conventional bicycle seats, once this problem is discovered by the rider, the only satisfactory solution is to replace the seat with another.

In order to solve this problem, a number of adjustable bicycle seats having one or more cushions have been developed. See for example, U.S. Pat. Nos. 4,089,559, 4,387,925, 4,512,608, 4,541,668, 4,877,286, 5,123,698, 5,709,430, 5,725,274, 5,823,618, 5,873,626, and 5,911,474, among many others.

While many of the referenced patents provide enhanced comfort and adjustment to a rider, all of them represent very complicated mechanical arrangements which are costly to produce.

The present invention provides for a split rail bicycle saddle which is simple in design, has few separate parts and accordingly is amenable to economical manufacture.

SUMMARY OF THE INVENTION

A bicycle saddle in accordance with the present invention generally includes a pair of elongate cushions with each cushion having a horn and a seat area. Rail means a or front frame provides means for holding the horn areas of each cushion in a spaced apart relationship with one another and a separate rear frame provides a means for holding the seat areas of each cushion in a spaced apart relationship with one another. More particularly, the rear frame is disposed in a spaced apart relationship with the front frame.

Means disposed in the rear frame are provided for enabling adjustment of the spaced apart relationship between the cushion seat areas. No significant separation of the spaced apart horn areas is effected by this adjustment.

The rail means, interconnected between the horn means or front frame and the rear frame also enables the attachment of the saddle to a bicycle post or the like.

More particularly, in accordance with the present invention, screw means are provided and disposed in the rear frame for tensioning the cushions between the first and second frames.

Fasteners are provided in the rear frame for enabling the adjustment of the spaced apart relationship between the cushion rear areas and, in addition, flat areas on the rail means are provided for engaging the fasteners in order to stabilize the rail means to prevent lateral movement thereof.

To facilitate the adjustment of the spaced apart relationship between the rear areas, the font frame may comprise means defining a central narrow area, for yielding thereof upon separation of the spaced apart relationship between the cushion rear seat areas. If the rail means attached directly to the horn means, a portion of the rail means between the horn means yields to accommodate separation of the seat areas.

Still more particularly, the rail means includes a pair of side-by-side rails and the screw means include two screws, with each screw surrounding an aft end of each rail. The screws are transversely and threadably engaged in the rear frame in order to tension cushions as hereinabove noted.

The rear frame itself comprises an elongate member disposed between the cushion rear areas and transverse to a longitudinal axis of the saddle. Fore ends of each of the rails may be connected to depending members, respectively, on the front frame. Importantly, the front frame is attached to the horn means at a distance from a nose of each cushion to enable flexing of the noses over the distance. This provides more comfort to the rider and reduces the possibility of rider injuring upon abrupt engagement therewith which may occur during riding.

BRIEF DESCRIPTION OF THE DRAWINGS

The present invention will be more readily understood in light of the following detailed description when considered in conjunction with the accompanying drawings in which:

FIG. 3 is a plan bottom view of the saddle shown in FIG. 1, more clearly showing a narrow area in the front frame and a rear frame disposed in a transverse manner between seat areas of the cushions along with screw means for tensioning the rails between the front and rear frames;

FIG. 4 is a cross sectional view of the rear frame taken along the line 4—4 of FIG. 3;

FIGS. 5 and 6 are side views in cross section illustrating the manner in which the rails are tensioned between the forward and rear frames.

DETAILED DESCRIPTION

Figure 1:
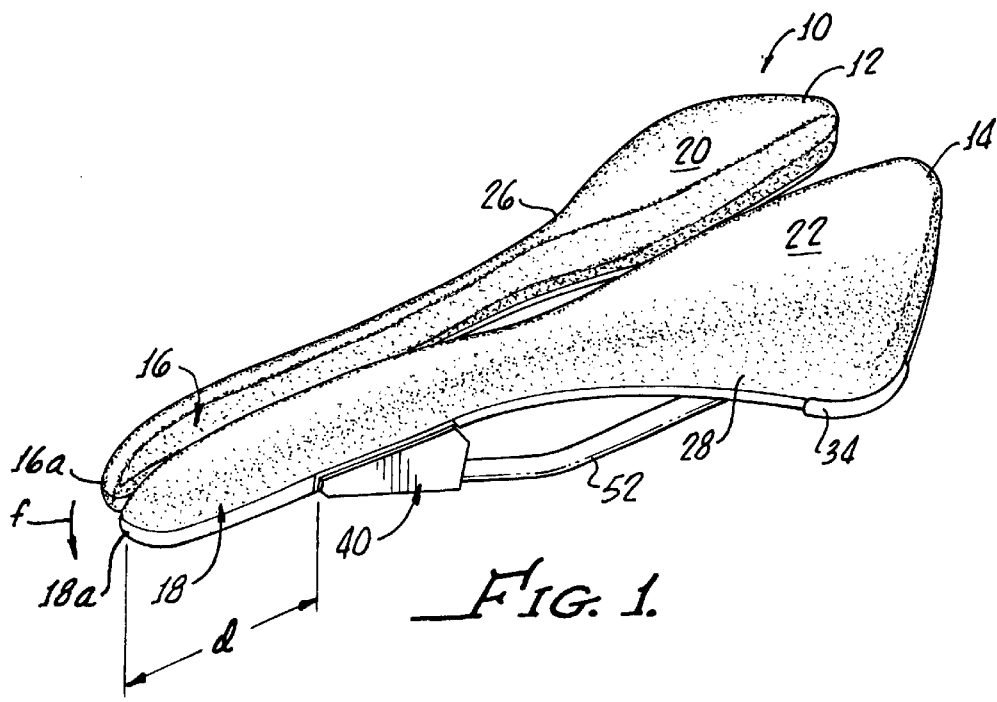
FIG. 1 is a perspective view of the bicycle saddle in accordance with the present invention generally showing a pair of elongate cushions disposed in a spaced apart relationship.
Figure 2:
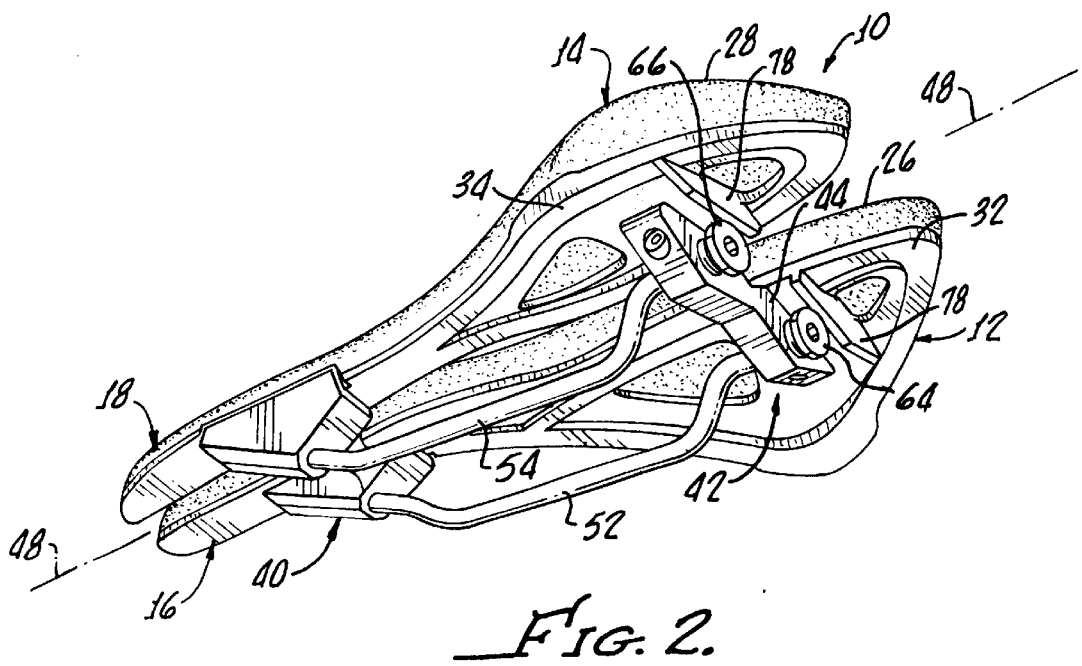
FIG. 2 is a perspective view of the bottom of the saddle shown in FIG. 1 more clearly showing front and rear frames attached to the elongate cushions with a pair of rails extending between the front and rear frames.

With reference to FIGS. 1 and 2, there is shown a bicycle saddle 10 in accordance with the present invention which generally includes a least one and preferably a pair of elongate cushions 12, 14, with each cushion 12, 14 having a horn 16, 18 and a seat area 20, 22, respectively.

Preferably, each of the cushions 12, 14 include a resilient pad 26, 28 disposed on a supporting shell 32, 34 in a conventional manner. The pads 26, 28 may be foam or gel or any suitable resilient material, and the shells 32, 34 may be formed from a relatively stiff but pliable plastic material.

An elongate front frame 40 provides a means for holding the horn areas 16, 18 in a spaced apart relationship with one another and a separate rear frame 42, spaced apart from the front frame 40, provides a means for holding the seat areas 20, 22 of each of the cushions 12, 14 in a spaced apart relationship with one another.

It should be appreciated that the rear frame 42, comprises an elongate member 44 which is disposed between the cushion rear seat areas 20, 22 and transverse to a longitudinal axis 48 of the saddle 10.

The separated front frame 40 and rear frame 42 are independent members which, as hereinafter discussed in greater detail, enables adjustment of the spacing between the rear cushion areas 20, 22 and adjusting the resiliency of the cushion 12, 14.

A pair of rails 52, 54 interconnecting the front and rear frames 40, 42 provides a means for enabling attachment of the saddle 10 to a bicycle post (not shown). The front and rear frames 40, 42 and the rails 52, 54 may be formed from any suitable material, but preferably a lightweight metal. The front frame 40 includes depending members 56, 58 which are fixed to fore ends 60, 62 of the rails 52, 54, respectively.

Screw nuts 64, 66 rotatably engaging aft ends 68, 70 of the rails 52, 54 and threadably engaging the elongate member 44, provide a means for independently tensioning the rails 52, 54 and cushions 12, 14 between the front and rear frames 40, 42. Thus, asymmetric tensioning of the cushion 12, 14 may be performed, if necessary, for rider comfort.

As more clearly shown in FIGS. 5 and 6, the screw 64 may be seated in a groove 74 to enable rotation of the screw 64 about the aft end 70 of the rail 52, while preventing longitudinal motion therebetween. FIG. 5 illustrates the screw 64 in a turned out position which provides more tension in the cushion 14, illustrated by an arrow 76, compared to the screw 64 position and tension in the cushion 12, 14 shown in FIG. 6.

The independent tensioning of each of the cushion 12, 14 is important in adjusting the overall resiliency of the cushions 12, 14 by changing the amount of flexure of the shells 32, 34, which, in turn, affects the resiliency of the pads 26, 28. Thus, a relatively harder or softer ride can be obtained by changing the tension in the rails 52, 54, which, in turn, changes the stress levels present in the shell 32, 34 and pads 26, 28, respectively.

As shown in FIG. 2, interference nodes 78 may be molded into the shells 32, 34 for engaging the screw nuts 64, 66 in order to prevent inadvertent rotation thereof as well as indicating to the user by resistance and sound, the amount of rotation given to the screw nuts 64, 66 during adjustment of tension.

With reference to FIGS. 2–4, bolts 80, 82 extending through the rear frame transverse member 44 and shells 32, 34 provide a means for enabling adjustment of the spaced apart relationship between the cushion seat areas 20, 22. While bolts 80, 82 are shown, it is to be appreciated that any other suitable fastener may be utilized in the present invention. The bolts 80, 82 are captured by nuts 86, 88 and transverse movement as indicated by arrows 92, 94 in FIG. 3 is enabled by slots 98, 100 in shells 32, 34, respectively.

Bolts heads 102, 104 are utilized to loosen the bolts 80, 82 within the slots 98, 100 after adjustment of the width between the shells 32, 34 and seat areas 20, 22. The heads 102, 104 are rotated to tighten the bolts 80, 82 within the slots 98, 100. This adjustment can be done in the field by simply utilizing a screwdriver, hex nut driver, or the like, corresponding to the type of engagement provided in the heads 102, 104.

Figure 7:
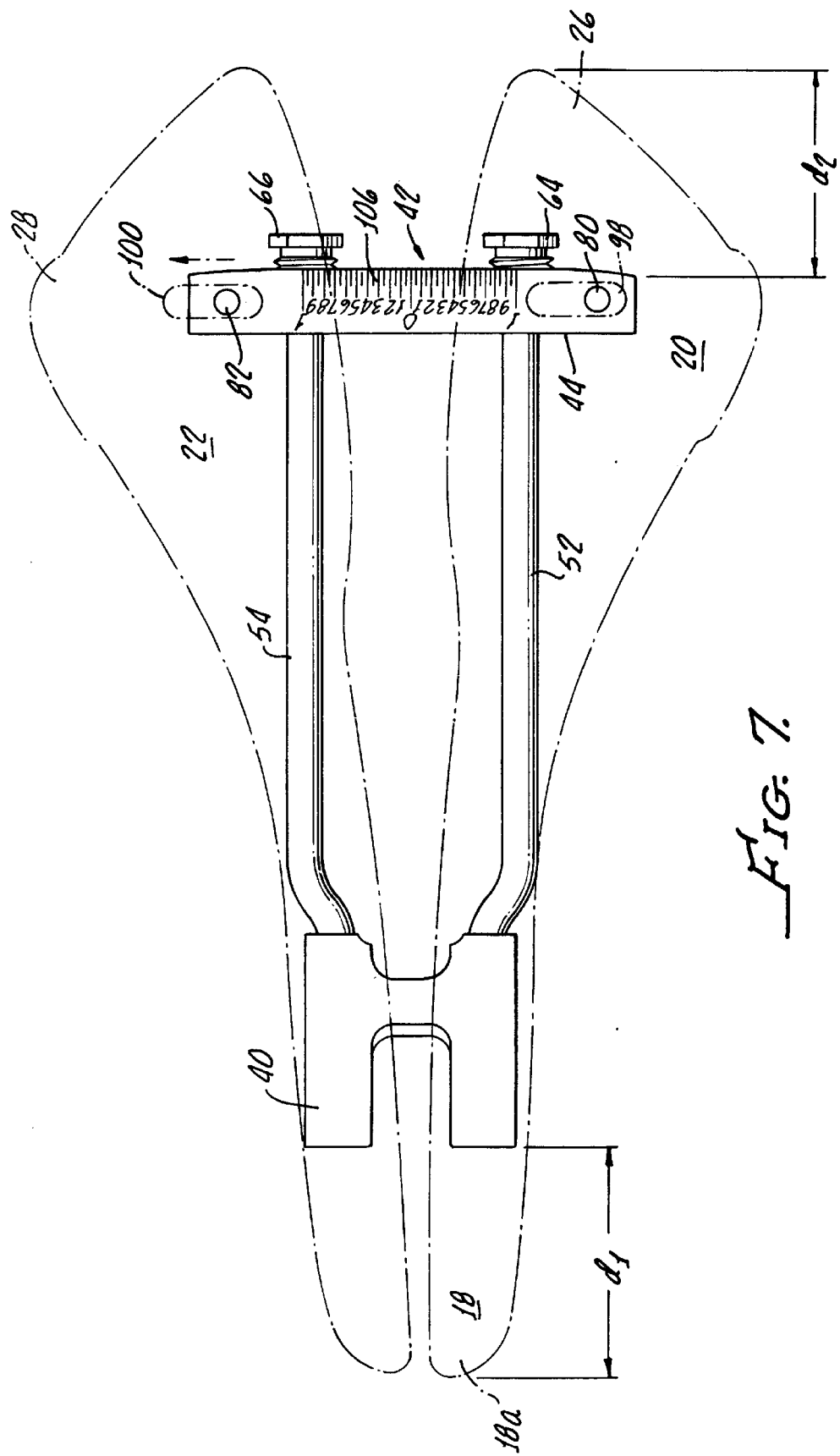
FIG. 7 is a plan top view of the saddle shown in FIG. 1, with the cushions being shown in broken line and calibration indicia on the rear frame between the cushions.

As shown in FIG. 7 indicia 106 on the rear frame 42 may be provided as a means for visually indicating the spaced apart relationship between the cushion 26, 28, specifically the seat areas 20, 22. The front frame is attached to the cushion 18 at a distance $d_1$ from a nose 18a in order to enable flexing of the nose 18a over the distance d1. Similarly, the rear frame 42 is attached to the seat area 20 at a distance $d_2$ from an end 20a in order to enable flexing of the seat area over the distance $d_2$.

Importantly, the front frame 40 includes a central narrow area 108 which enables yielding of the frame upon adjustment of the spacing between the cushions 20, 22 and accordingly enables the adjustment of the spaced apart relationship between the seat cushion rear areas 20, 22 without significant movement of the horn area 16, 18.

With further reference to FIG. 4, the bolts 80, 82 bear against flat areas 108, 110 on the aft ends 68, 70 of the rails 52, 54 which provides a means for stabilizing the rails 52, 54 between the front frame 40 and the rear frame 42 in order to prevent any lateral movement thereof. This is important in providing a stable saddle 10 for rider comfort.

Because the spaced apart relationship between the rear seat areas 20, 22 is adjustable, the saddle can be adapted to an individual rider's anatomical configuration. Further, this adjustment can be done in the field so that if pressure points develop, a simple adjustment in rear seat width may be performed.

Figure 8:
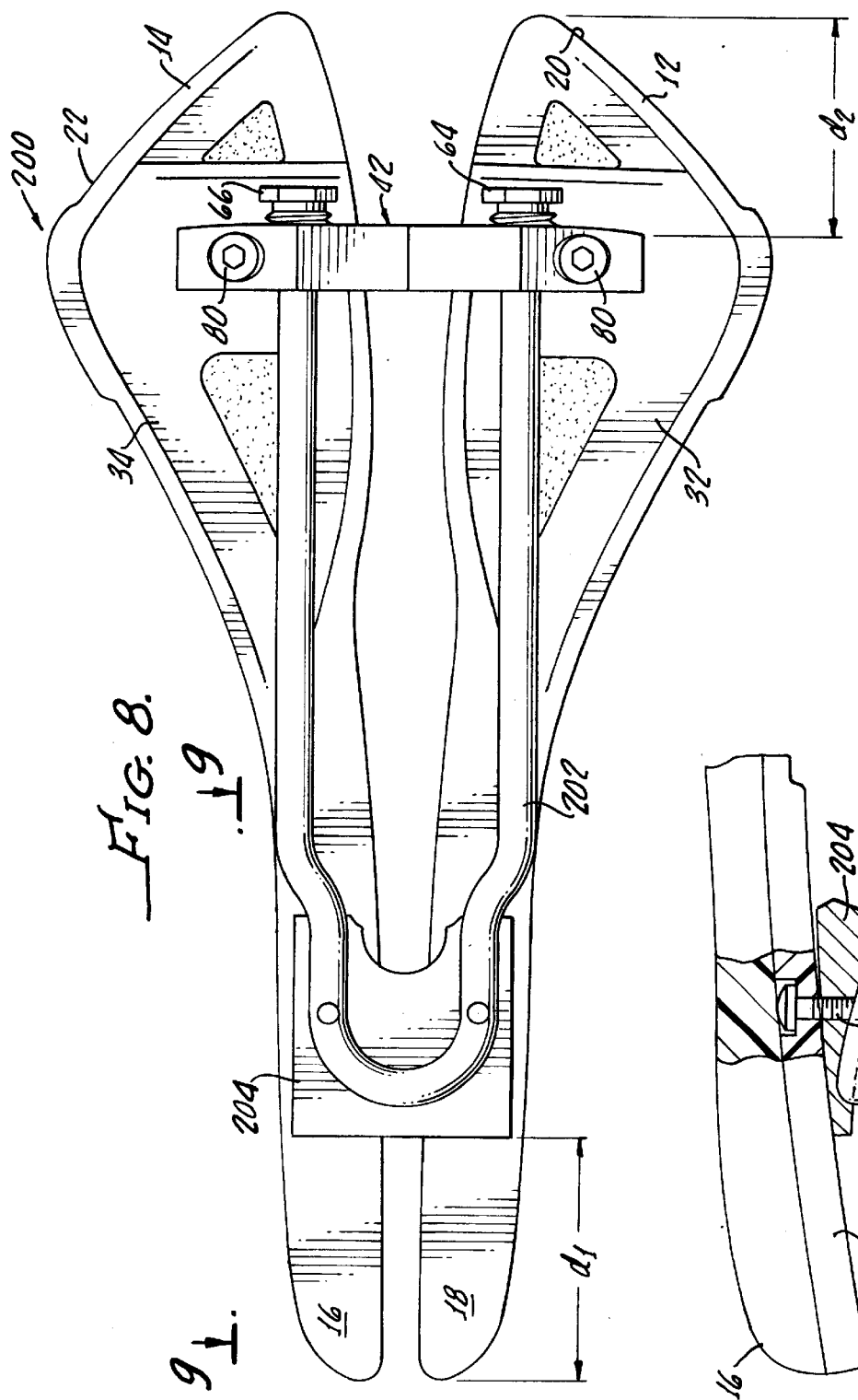
FIG. 8 is a plane view of an alternative embodiment of the present invention showing a unitary frame.
Figure 9:
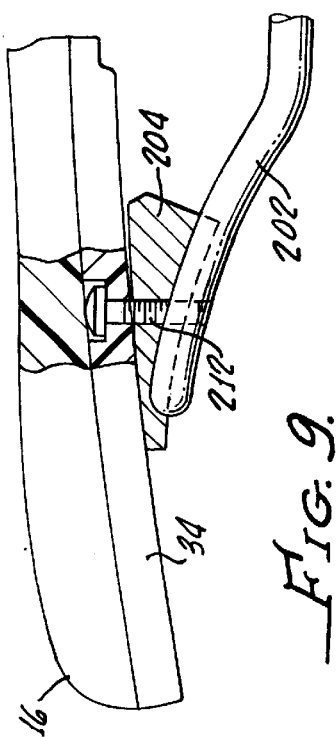
FIG. 9 is a side view of a nose portion of the embodiment shown in FIG. 8 in partial cross section showing attachment of the unitary rail to the cushion at a spaced apart distance from an end, or tip of the cushion horn area.

FIGS. 8 and 9 show another embodiment 200 in accordance with the present invention with common reference characters indicating identical or substantially similar components of the embodiment 10 shown in FIGS. 1–7. In this embodiment 200 a unitary rail 202 is attached to the rear frame 42 as herein discussed in connection with embodiment 10.

The rail 202 may be attached to the horn areas 16, 18 by means of a bracket 204, or directly to the horn areas 16, 18 with screws 212 threadably engaging the rail 202 and passing through the shells 32, 34 as shown in cross section. The use of a unitary rail simplifies construction of the saddle embodiment 200 and yielding thereof enables adjustment of the spaced apart relationship between the seat areas 20, 22 of the saddle 200.

Although there has been hereinabove described a specific bicycle saddle in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the present invention as defined in the appended claims.

What is claimed is:

1. A bicycle saddle comprising:
   a pair of elongate cushions, each cushion having a horn and a seat area;

a front frame for holding the horn areas of each cushion in a spaced apart relationship with one another, said front frame including a narrow central area for yielding upon adjustment of the spaced apart relationship between the cushion seat areas;

a separate rear frame for holding the seat areas of each cushion in a spaced apart relationship with one another, the rear frame being spaced apart from said front frame;

means, disposed in said rear frame for enabling adjustment of the spaced apart relationship between the cushion seat areas;

screw means, disposed in said separate rear frame means, for independently tensioning each cushion between the front and rear frames; and rails interconnecting the front and rear frames, for enabling attachment of the saddle to a bicycle post.

2. The bicycle saddle according to claim 1 further comprising shells for supporting the cushions.

3. The bicycle saddle according to claim 2 wherein said shells comprise stops for limiting outward movement of said screw means.

4. The bicycle saddle according to claim 3 wherein said shells further comprises interference nodes for engaging said screw means in order to prevent inadvertent rotation thereof.

5. The bicycle saddle according to claim 1 wherein the means for enabling adjustment of the spaced apart relationship between the cushion seat areas comprises fasteners in said rear frame means and slots in the cushions.

6. The bicycle saddle according to claim 5 further comprising a calibrator for visually indicating the spaced apart relationship between the cushion seat areas.

7. The bicycle saddle according to claim 6 wherein said calibrator is disposed on the rear frame.

8. The bicycle saddle according to claim 5 further comprises means, including flat areas on said rail means, for engaging said fasteners in order to stabilize said rail means and to prevent lateral movement thereof.

9. The bicycle saddle according to claim 1 wherein said rail rails includes a pair of side by side rails and said screw means include two screws, each screw surrounding an aft end of each rail, said screws transversely and threadably engaging said rear frame.

10. The bicycle saddle according to claim 9 wherein said rear frame means comprises an elongate member disposed between the cushion seat areas and transverse to a longitudinal axis of the saddle.

11. The bicycle saddle according to claim 1 wherein said front frame means includes two depending members, one on each side of said central narrow area, each depending member being connected to a fore end of each rail.

12. The bicycle saddle according to claim 1 wherein said front frame means is attached to the horn areas at a distance from noses of the horn areas in order to enable flexing of the noses over the distance.

13. The bicycle saddle according to claim 1 wherein said separate rear frame is attached to the seat areas at a distance from a back end of the seat area in order to enable flexing of the seat areas over the distance.

* * * * *